(12) United States Patent
Paolini, Jr.

(10) Patent No.: US 10,545,622 B2
(45) Date of Patent: Jan. 28, 2020

(54) MAGNETICALLY-RESPONSIVE DISPLAY INCLUDING A RECORDING LAYER CONFIGURED FOR LOCAL AND GLOBAL WRITE/ERASE

(71) Applicant: E INK CORPORATION, Billerica, MA (US)

(72) Inventor: Richard J. Paolini, Jr., Framingham, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/600,711

(22) Filed: May 20, 2017

(65) Prior Publication Data
US 2017/0336896 A1 Nov. 23, 2017

Related U.S. Application Data

(60) Provisional application No. 62/339,742, filed on May 20, 2016.

(51) Int. Cl.
| | |
|---|---|
| *G06F 3/046* | (2006.01) |
| *G06F 3/0354* | (2013.01) |
| *G09G 3/34* | (2006.01) |
| *G02F 1/1673* | (2019.01) |
| *B41J 3/407* | (2006.01) |
| *G02F 1/167* | (2019.01) |
| *G09F 9/37* | (2006.01) |

(52) U.S. Cl.
CPC ............ *G06F 3/046* (2013.01); *B41J 3/4076* (2013.01); *G02F 1/167* (2013.01); *G02F 1/1673* (2019.01); *G06F 3/03545* (2013.01); *G09G 3/344* (2013.01); *G09G 3/3486* (2013.01); *G09F 9/375* (2013.01)

(58) Field of Classification Search
CPC .... G06F 3/046; G06F 3/03545; G06F 3/0416; G06F 2354/00; G06F 3/0354; G06F 3/03543; G06F 3/041–3/047; G09G 3/344; G09G 2354/00; G09G 3/3446; G09G 3/3486; G09F 9/375; G02F 1/01; G02F 1/17; G02F 1/19; G02F 1/167; G02F 1/1673; B41J 3/4076
See application file for complete search history.

(56) References Cited

U.S. PATENT DOCUMENTS

| | | |
|---|---|---|
| 3,292,171 A | 12/1966 | Wilson |
| 3,683,382 A | 8/1972 | Ballinger |
| 4,418,346 A | 11/1983 | Batchelder |

(Continued)

OTHER PUBLICATIONS

Hayes, R.A. et al., "Video-Speed Electronic Paper Based on Electrowetting", Nature, vol. 425, Sep. 25, pp. 383-385 (2003) Sep. 25, 2003.

(Continued)

*Primary Examiner* — Gene W Lee
(74) *Attorney, Agent, or Firm* — William Kohn Keyes

(57) ABSTRACT

A recording layer is described that comprises a magnetizable material configured to store an image represented by magnetized regions of the magnetizable material. The magnetizable material may be brought into proximity with a magnetically responsive display layer, which may cause a change in an optical state of the display layer such that a facsimile of the image represented by the magnetized regions is produced within the display layer.

11 Claims, 10 Drawing Sheets

(56) References Cited

U.S. PATENT DOCUMENTS

| | | | | |
|---|---|---|---|---|
| 5,872,552 | A | 2/1999 | Gordon, II | |
| 6,097,531 | A * | 8/2000 | Sheridon | G02B 26/026 264/15 |
| 6,110,538 | A * | 8/2000 | Sheridon | G02B 26/026 427/130 |
| 6,130,774 | A | 10/2000 | Albert | |
| 6,144,361 | A | 11/2000 | Gordon, II | |
| 6,147,791 | A * | 11/2000 | Sheridon | G02B 26/026 345/10 |
| 6,172,798 | B1 | 1/2001 | Albert | |
| 6,174,153 | B1 * | 1/2001 | Sheridon | G02B 26/026 264/8 |
| 6,184,856 | B1 | 2/2001 | Gordon, II | |
| 6,197,228 | B1 * | 3/2001 | Sheridon | G02B 26/026 264/1.36 |
| 6,211,998 | B1 * | 4/2001 | Sheridon | G02B 26/026 264/15 |
| 6,225,971 | B1 | 5/2001 | Gordon, II | |
| 6,241,921 | B1 | 6/2001 | Jacobson | |
| 6,251,329 | B1 * | 6/2001 | Sheridon | G02B 26/026 264/343 |
| 6,262,707 | B1 * | 7/2001 | Sheridon | G02B 26/026 345/111 |
| 6,271,823 | B1 | 8/2001 | Gordon, II | |
| 6,326,945 | B1 * | 12/2001 | Williams, III | G06F 3/046 345/111 |
| 6,517,618 | B2 * | 2/2003 | Foucher | C09D 11/50 106/31.16 |
| 6,542,283 | B1 * | 4/2003 | Sheridon | G02B 26/026 347/172 |
| 6,549,327 | B2 * | 4/2003 | Foucher | C07D 491/10 359/296 |
| 6,672,921 | B1 | 1/2004 | Liang | |
| 6,788,449 | B2 | 9/2004 | Liang | |
| 6,788,452 | B2 * | 9/2004 | Liang | G02F 1/133377 359/296 |
| 6,831,771 | B2 * | 12/2004 | Ho | G02F 1/09 345/105 |
| 6,847,347 | B1 * | 1/2005 | Kazmaier | B82Y 25/00 345/107 |
| 6,866,760 | B2 | 3/2005 | Paolini, Jr. | |
| 6,870,661 | B2 | 3/2005 | Pullen et al. | |
| 6,894,677 | B2 * | 5/2005 | Kazmaier | B82Y 25/00 345/107 |
| 6,914,713 | B2 * | 7/2005 | Chung | G02F 1/167 345/107 |
| 6,922,276 | B2 | 7/2005 | Zhang et al. | |
| 6,927,892 | B2 * | 8/2005 | Ho | G02F 1/09 345/107 |
| 6,950,220 | B2 | 9/2005 | Abramson et al. | |
| 6,982,178 | B2 | 1/2006 | LeCain et al. | |
| 7,002,728 | B2 | 2/2006 | Pullen et al. | |
| 7,012,600 | B2 | 3/2006 | Zehner | |
| 7,072,095 | B2 * | 7/2006 | Liang | G02F 1/167 345/107 |
| 7,075,502 | B1 | 7/2006 | Drzaic | |
| 7,079,303 | B2 * | 7/2006 | Hou | G02F 1/167 340/321 |
| 7,113,323 | B2 * | 9/2006 | Ho | G02F 1/09 345/107 |
| 7,116,318 | B2 | 10/2006 | Amundson et al. | |
| 7,142,351 | B2 * | 11/2006 | Chung | G02F 1/09 359/296 |
| 7,170,670 | B2 | 1/2007 | Webber | |
| 7,205,355 | B2 * | 4/2007 | Liang | C09J 153/00 524/474 |
| 7,236,291 | B2 | 6/2007 | Kaga et al. | |
| 7,304,787 | B2 | 12/2007 | Whitesides et al. | |
| 7,312,784 | B2 | 12/2007 | Baucom et al. | |
| 7,321,459 | B2 | 1/2008 | Masuda et al. | |
| 7,390,901 | B2 * | 6/2008 | Yang | C09B 1/262 546/33 |
| 7,411,719 | B2 | 8/2008 | Paolini, Jr. et al. | |
| 7,420,549 | B2 | 9/2008 | Jacobson | |
| 7,453,445 | B2 | 11/2008 | Amundson | |
| 7,473,782 | B2 * | 1/2009 | Yang | C09B 1/262 546/33 |
| 7,532,389 | B2 * | 5/2009 | Li | C07F 7/045 359/296 |
| 7,576,904 | B2 * | 8/2009 | Chung | G02F 1/167 345/107 |
| 7,580,180 | B2 * | 8/2009 | Ho | B43L 1/008 345/107 |
| 7,679,814 | B2 | 3/2010 | Paolini, Jr. et al. | |
| 7,839,564 | B2 | 11/2010 | Whitesides et al. | |
| 7,951,938 | B2 * | 5/2011 | Yang | C09B 1/262 540/145 |
| 7,999,787 | B2 | 8/2011 | Amundson | |
| 8,009,348 | B2 | 8/2011 | Zehner | |
| 8,018,643 | B2 * | 9/2011 | Ho | B43L 1/008 345/107 |
| 8,238,022 | B2 * | 8/2012 | Joo | G02F 1/23 359/296 |
| 8,319,759 | B2 | 11/2012 | Jacobson | |
| 8,537,453 | B2 * | 9/2013 | Joo | G02F 1/23 359/296 |
| 8,638,492 | B2 * | 1/2014 | Chen | G02F 1/167 359/296 |
| 8,810,896 | B2 * | 8/2014 | Tamoto | B41J 2/385 345/107 |
| 8,850,689 | B2 * | 10/2014 | Chen | G02F 1/167 29/592.1 |
| 8,994,705 | B2 | 3/2015 | Jacobson | |
| 9,114,663 | B2 * | 8/2015 | Ho | B43L 1/008 |
| 9,122,121 | B2 * | 9/2015 | Yamashita | G02F 1/167 |
| 9,606,413 | B2 * | 3/2017 | Jang | G02F 1/167 |
| 9,880,646 | B2 * | 1/2018 | Sainis | G06F 3/03545 |
| 10,037,089 | B2 * | 7/2018 | Bishop | G09G 3/344 |
| 10,388,233 | B2 * | 8/2019 | Paolini, Jr. | G06F 3/03545 |
| 2002/0171910 | A1 * | 11/2002 | Pullen | G02F 1/167 359/296 |
| 2003/0218065 | A1 * | 11/2003 | Viswanathan | G06K 1/125 235/449 |
| 2004/0030125 | A1 * | 2/2004 | Li | C07F 7/045 540/126 |
| 2006/0038772 | A1 * | 2/2006 | Amundson | G02F 1/167 345/107 |
| 2007/0117415 | A1 * | 5/2007 | Shikina | G02F 1/13338 439/55 |
| 2007/0268567 | A1 * | 11/2007 | Chung | G02F 1/167 359/296 |
| 2008/0285113 | A1 * | 11/2008 | Gillies | G02F 1/167 359/296 |
| 2012/0274619 | A1 * | 11/2012 | Lee | G09G 3/3453 345/209 |
| 2012/0293858 | A1 | 11/2012 | Telfer, Jr. | |
| 2013/0044048 | A1 * | 2/2013 | Joo | G02F 1/167 345/107 |
| 2014/0307039 | A1 * | 10/2014 | Tamoto | G02F 1/167 347/221 |
| 2015/0168798 | A1 * | 6/2015 | Yamashita | G02F 1/167 359/296 |
| 2015/0177588 | A1 * | 6/2015 | Tamoto | G02F 1/167 359/296 |
| 2015/0246553 | A1 * | 9/2015 | Tamoto | G11B 9/063 347/199 |
| 2015/0277160 | A1 | 10/2015 | Laxton | |
| 2016/0297602 | A1 * | 10/2016 | Hutchins | G06K 19/042 |
| 2017/0045954 | A1 * | 2/2017 | Leoni | G02F 1/167 |

OTHER PUBLICATIONS

Kitamura, T. et al., "Electrical toner movement for electronic paper-like display", Asia Display/IDW '01, p. 1517, Paper HCS1-1 (2001) Jan. 1, 2001.

(56) References Cited

OTHER PUBLICATIONS

Yamaguchi, Y. et al., "Toner display using insulative particles charged triboelectrically", Asia Display/IDW '01, p. 1729, Paper AMD4-4 (2001) Jan. 1, 2001.

* cited by examiner

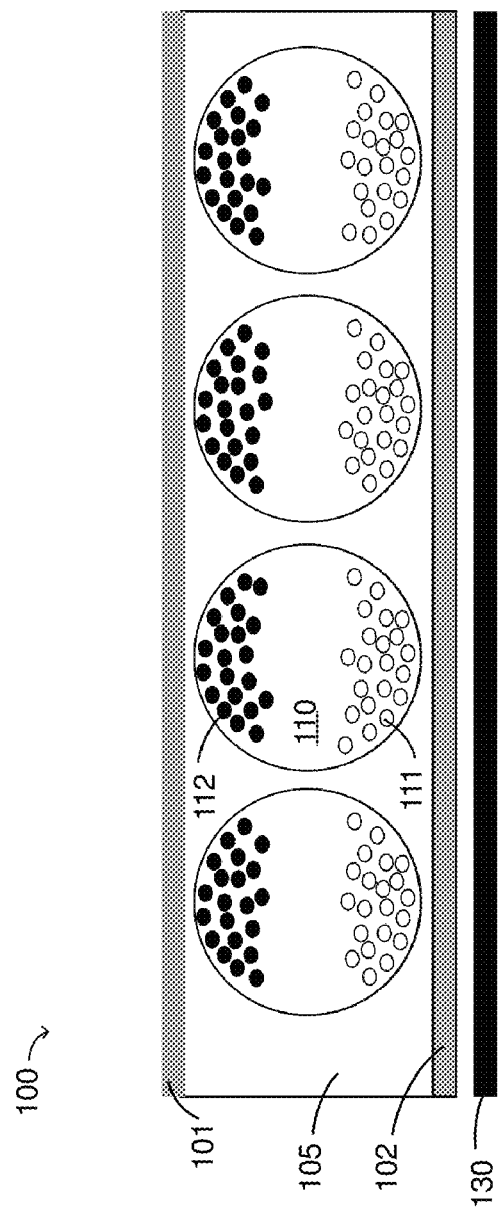

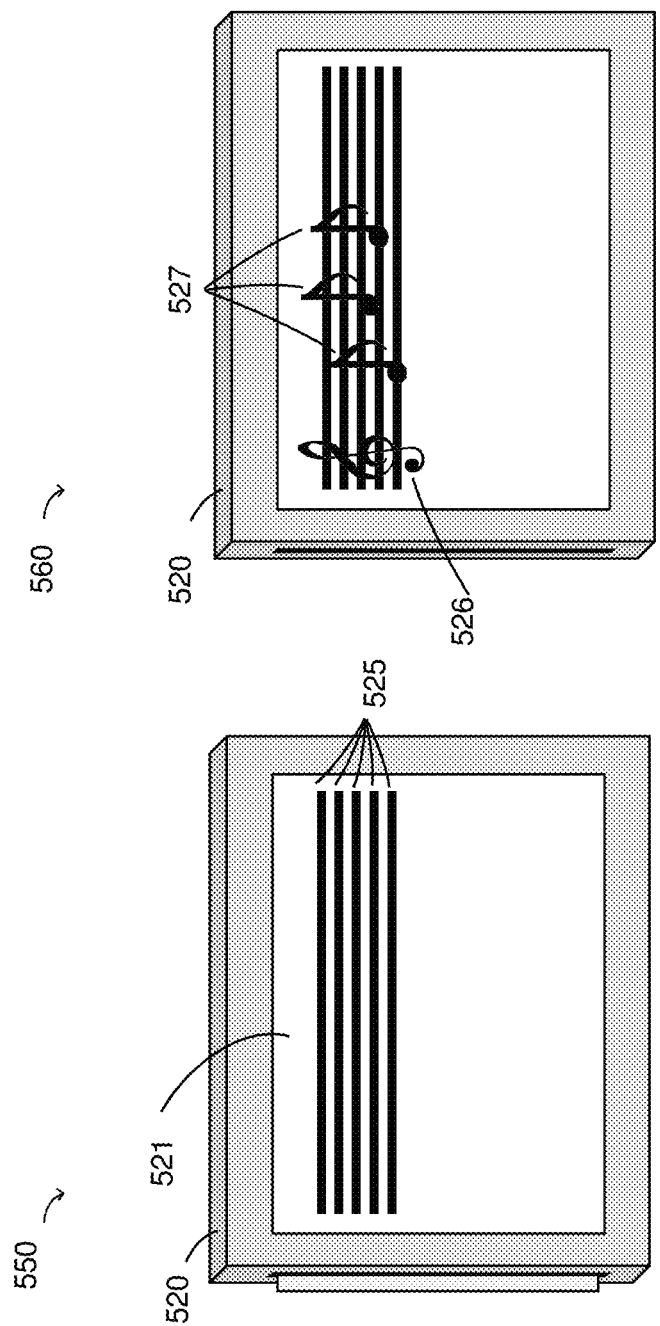

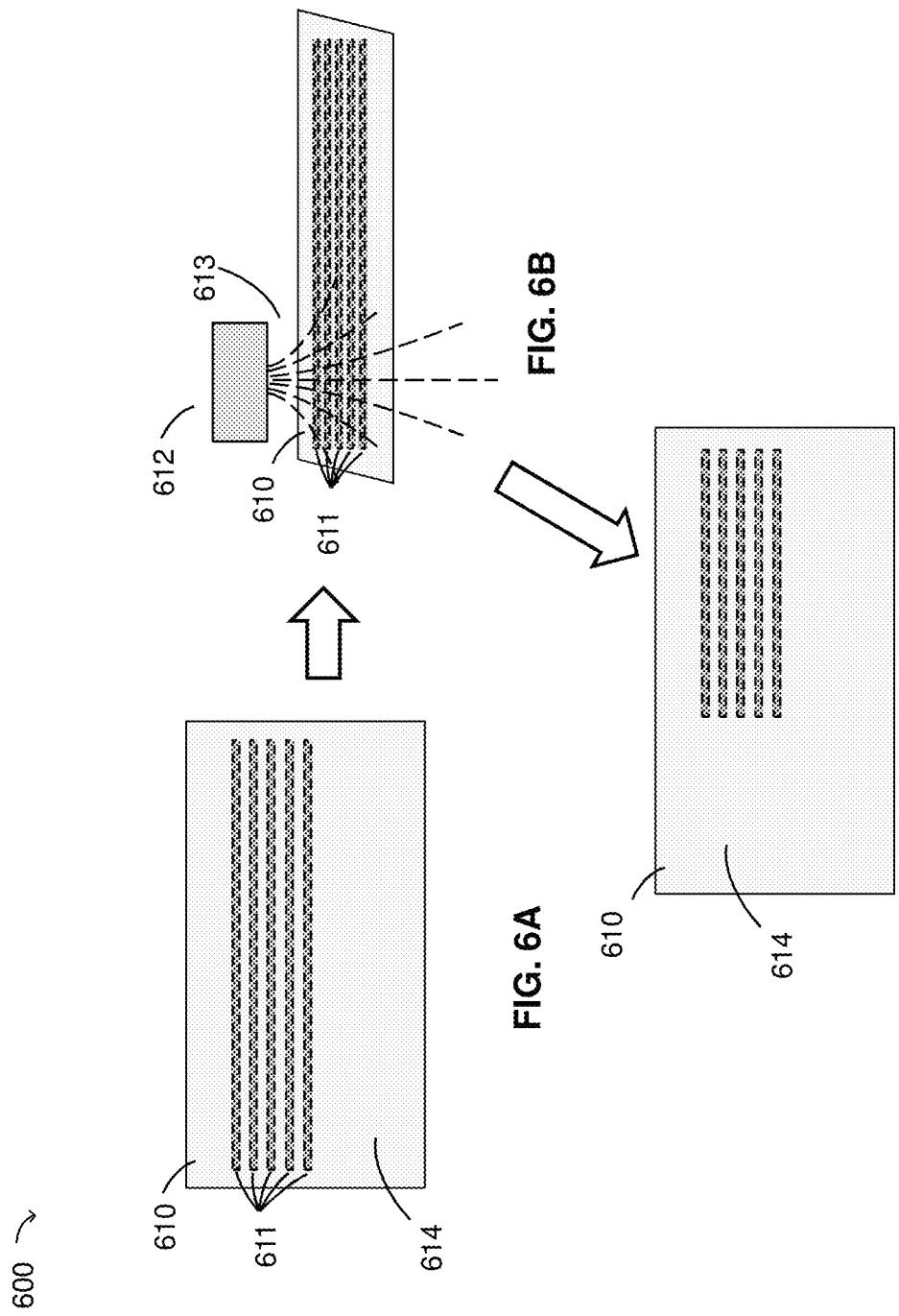

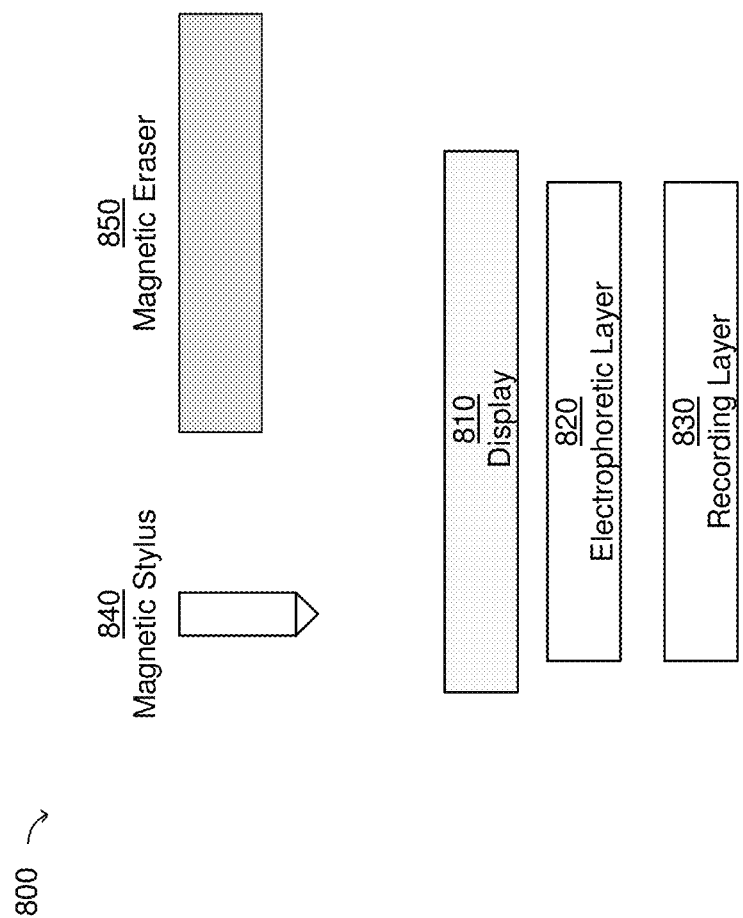

MAGNETICALLY-RESPONSIVE DISPLAY INCLUDING A RECORDING LAYER CONFIGURED FOR LOCAL AND GLOBAL WRITE/ERASE

BACKGROUND

The technology described herein relates to magnetically-addressable displays and related apparatus and methods.

Some electronic displays may be addressed with a stylus. For such electronic displays, the electronic display may activate pixels corresponding to those over which the stylus passed. For example, magnetically addressable displays, which may be electronic or non-electronic, may be addressed with a magnetic stylus. Additionally, or alternatively, the electronic display may be activated to display an image by causing the display to emit light in the pattern of the image.

SUMMARY

The invention includes electro-optic displays that can be addressed with both electric fields and magnetic fields. In particular, displays of the invention can be addressed with magnetizable materials that can be written with, e.g., a magnet. The magnetizable materials can be removed from the display, the image cleared on the display, but when the magnetizable material is returned to proximity of the display, the image will spontaneously re-appear. Thus, the system can be addressed and erased locally with a stylus, e.g., having a magnetic, such as a neodymium magnet. At the same time, the system can also be erased globally using electronic switching, and the system can be addressed globally with the magnetizable material, or additional magnetizable materials.

The application provides a display system, including a front electrode, a rear electrode, a display layer sandwiched between the front and rear electrodes comprising a fluid including a first set of magneto-electrophoretic particles, the magneto-electrophoretic particles configured to move in response to a magnetic field and to move in response to an electric field, a removable recording layer comprising a magnetizable material; and a retainer to hold the removable recording layer in proximity to the display layer. In some embodiments, the display system includes a second set of electrophoretic particles configured to move in response to application of an electric field, wherein the first and second sets of particles have opposite electric charges and contrasting colors. In some embodiments, the fluid is a color that contrasts with the color of the first set of magneto-electrophoretic particles. In some embodiments, the fluid in the display layer is encapsulated. The system can be augmented with the addition of a handheld writing implement producing a magnetic field that, when applied to a surface of the display system, causes motion of the magneto-electrophoretic particles and causes magnetization of at least part of the recording layer. Often times, the display system will also include a retainer with a mechanism for moving the recording layer relative to the display layer.

The recording layer may be constructed from a sheet of magnetizable material comprising both magnetized regions and non-magnetized regions within the sheet of magnetizable material. In some embodiments, the non-magnetized regions are formed by removing regions of the magnetizable material. The magnetizable material may be ferromagnetic, for example constructed from steel with a high iron content.

The display system may include a body surrounding the front electrode, the rear electrode, the display layer, the recording layer, and the retainer, the body including at least one slot through which the recording layer may be inserted into the retainer so that the recording layer is held in proximity to the display layer. The display system may also include a power supply and a controller configured to provide an electric potential to the front and rear electrodes.

Using a display system described herein, it is possible to write, erase, and record on both a global and a local level. The application describes a method including providing a display comprising a front electrode, a rear electrode, a display layer sandwiched between the front and rear electrodes comprising a fluid including magneto-electrophoretic particles, the magneto-electrophoretic particles configured to move in response to a magnetic field and to move in response to an electric field. Thereafter the display system is addressed by positioning, proximate the display layer, a magnetizable material storing an image embedded in magnetized regions of the magnetizable material. In some embodiments, the magnetizable material is inserted into a retainer that holds the magnetizable material proximate to the display layer. For example, the magnetizable material can be positioned less than 5 mm from the magnetically responsive display layer.

Alternatively, the method may include providing a display system comprising a front electrode, a rear electrode, a display layer sandwiched between the front and rear electrodes comprising a fluid including magneto-electrophoretic particles, the magneto-electrophoretic particles configured to move in response to a magnetic field and to move in response to an electric field, a recording layer comprising a magnetizable material in proximity to the display layer, and a handheld writing implement producing a magnetic field. Thereafter, both the display layer and the magnetizable material can be addressed simultaneously with the handheld writing implement to create an image. After the display layer and magnetizable material are addressed, the magnetizable material can be removed from proximity to the display layer, whereupon an electric potential can be provided to the front or rear electrode to cause the magneto-electrophoretic particles to move toward the front electrode, thereby removing the image from the display. After this step, the magnetizable material may be returned to proximity of the display layer, thus allowing the image to reform in the display layer.

Additionally, an aspect of the present application includes using a recordable medium comprising magnetizable material, to store an image, wherein the image is represented by magnetized regions of the magnetizable material.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 1A is a schematic drawing depicting a display and a magnetizable recording layer, according to some embodiments;

FIG. 5B is a schematic drawing illustrating a facsimile of the image produced on the display shown in FIG. 5A, according to some embodiments;

FIG. 5C is a schematic drawing illustrating local addressing of the display shown in FIG. 5B, according to some embodiments;

FIGS. 6A-6C are schematic drawings illustrating local erasing of a magnetizable recording layer having an image stored thereon, according to some embodiments;

FIG. 8 is a schematic drawing depicting a display system with which aspects of the invention may be implemented.

DETAILED DESCRIPTION

Figure 1B:
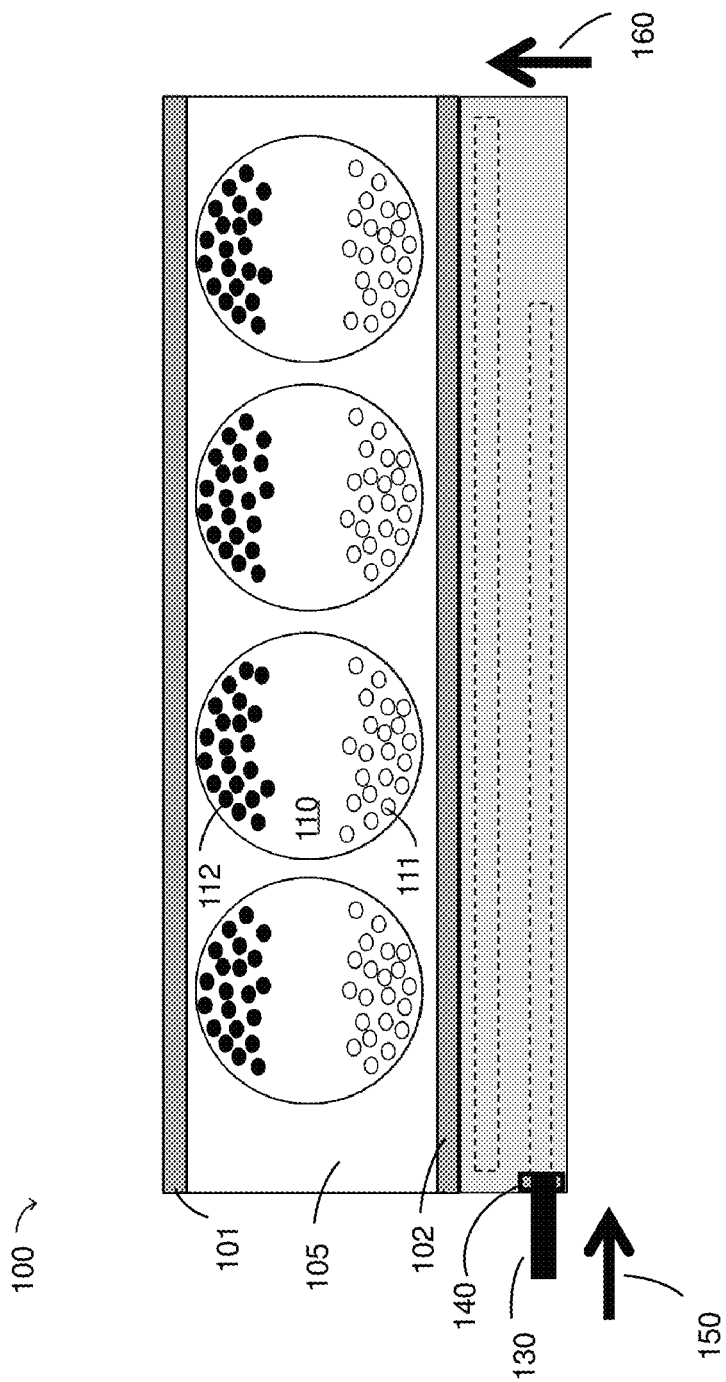
FIG. 1B is a schematic drawing depicting a display having a mechanism for inserting a magnetizable recording layer, according to some embodiments.

As described herein a magnetically-responsive display can be constructed to allow a user to have the ability to write and erase on a global and local scale. Furthermore, using various inserts, it is possible to "write" a framework onto the display, for example lines for practicing penmanship. A display of the invention will typically include a recording layer comprising a colored magnetizable material that will retain its spatial arrangement and thus the image on the display. The magnetizable material may be brought into proximity with a magnetically responsive display layer, which may be a particle-based magneto-electrophoretically-responsive display layer, such as one comprising magneto-electrophoretic particles, which may be colored iron particles that are surface treated with polymers to control dispersion of the particles within a fluid.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states. Further, as used herein, the extreme states include the dark and light states resulting from driving an display magnetically, which typically do not achieve the extreme black and white states but achieve dark gray (almost black) and light gray (almost white) states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 6,870,661, 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 7,075,502 and 7,839,564;
(f) Methods for driving displays; see for example U.S. Pat. Nos. 7,012,600, 7,304,787 and 7,453,445;
(g) Applications of displays; see for example U.S. Pat. Nos. 7,312,784 and 8,009,348; and
(h) Non-electrophoretic displays, as described in U.S. Pat. Nos. 6,241,921; 6,950,220; 7,420,549 8,319,759; and 8,994,705 and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; 6,184,856; 7,304,787 and 7,999,787. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

In magnetically addressable displays having two particles, for example, black and white particles, magnetic addressing only generates gray states of varying degrees of lightness or darkness. The magnetic field may be tuned to the desired gray state. Electrical switching, i.e., an electro-optic display, is required to drive the particles to achieve full black and white optical states. In magnetically addressable displays, the black state is not required to be fully black, simply dark. Likewise, the white state is not required to be fully white, simply light. The focus is on the difference between the background and the magnetically addressed area to display the image. As used herein, black state refers to the dark state, including the fully black state associated with electrical addressing, and white state refers to the light state, including the fully white state associated with electrical addressing. From either optical state (dark or light), the magnetic stylus drives the pigment particles towards a gray state. From a black or dark state, the magnetic stylus switches the optical state toward a lighter gray state. From a white state or light state, the magnetic stylus switches the optical state toward a darker gray state.

Aspects of the present application relate to a recording layer comprising a magnetizable material that stores an image represented by magnetized regions of the magnetizable material. The magnetizable material may be brought into proximity with a magnetically responsive display layer, which may be a particle-based magnetically responsive display layer, such as one comprising electrophoretic particles. The magnetized regions of the magnetizable material may cause a change in an optical state of the display layer such that a facsimile (also referred to herein as a "copy") of the image represented by the magnetized regions is produced within the display layer.

According to some embodiments, regions of a magnetizable material within a recording layer may be magnetized via a magnetic writing implement. The recording layer may subsequently be brought into proximity with a magnetically responsive display layer, thereby producing a facsimile of the regions of the magnetizable material previously magnetized by the writing implement. In some embodiments, regions of a magnetizable material may be magnetized by a magnetic writing implement while in proximity to a magnetically responsive display layer, such that the writing implement causes both a change in an optical state of the display layer in addition to magnetizing the regions of the magnetizable material. The recording layer may be separated from the display layer and subsequently brought into proximity with the same or a different display layer. The term "writing implement" as used herein includes any suitable handheld device, such as those shaped like a pencil, a pen or a marker. For example, a magnetic marker may generate a magnetic field and may be used to magnetize regions of a magnetizable material.

According to some embodiments, a display system may include one or more mechanisms that facilitate insertion and removal of a recording layer from a body of the display system. Accordingly, the recording layer may be brought into proximity with a magnetically responsive display layer of the display system via the one or more mechanisms, which may facilitate movement of the recording layer relative to the magnetically responsive display layer and/or may provide mechanical support for the recording layer within the body of the display system (whether in proximity to the magnetically responsive display layer or not). In some embodiments, a display system may be configured to contain multiple recording layers that may be independently inserted, removed and brought into (and out of) proximity with a magnetically responsive display layer of the display system. The recording layer may be embodied as a sheet, a plate, or an insert, among other possibilities. In some embodiments, the recording layer may be brought into proximity with a magnetically responsive electro-optic display layer while the electrical voltage is applied so that the display maintains its optical state according to the electrical voltage applied and once the electrical voltage is removed, the display will optically change to the magnetically recorded image. In some embodiments, the recording layer may be brought into proximity with a magnetically responsive electro-optic display layer while the electrical voltage is not applied so that the display changes its optical state according to the magnetically recorded image, which may appear scrambled if it addresses the display while being moved into place. Once the recording layer is in place, the electrical voltage is applied to reset the optical state and removed. Once the electrical voltage is removed, the display will optically change according to the magnetically recorded image.

In some embodiments, regions of a magnetizable material within a recording layer may be demagnetized (or may otherwise have its magnetization altered) via a magnetic erasing implement. The magnetic erasing implement may provide a magnetic field sufficient to erase an image represented by magnetized regions of a magnetizable material within a recording layer. The process of "erasing" may include altering the magnetizable material such that magnetized regions representing an image become demagnetized. Alternatively, or additionally, "erasing" may include magnetizing regions representing an image in addition to other regions of a magnetizable material such that the regions previously magnetized to represent an image no longer have a magnetization state that differs from adjacent regions of the material. In this case, the magnetization produced by the magnetic erasing implement may be of a lesser magnitude that the magnitude of magnetization of the regions that were magnetized to represent an image prior to the step of erasing. The magnetizable material may be erased by the magnetic erasing implement directly or may be erased while inserted into a display system. If erased while inserted into a display system, the display may be optically altered and erased along with the magnetizable material.

According to some embodiments, a magnetically responsive display layer within an electronic display system may be a particle-based display layer. In some cases, the particles may include one or more types of pigments. In a single-pigment display, the pigment may be both electrically and magnetically controllable. In a multi-pigment display, at least one of the pigment types may be both electrically and magnetically controllable. One example of a multi-pigment display is a display including white pigment particles and black pigment particles. The black pigment particles may be both electrically and magnetically controllable, as an example. According to some embodiments, a magnetically responsive display layer within a magnetically responsive (non-electronic) display system may be a particle-based display layer. In some cases, the particles may include one or more types of pigments. In a single-pigment display, the pigment may be both electrically and magnetically controllable. In a multi-pigment display, at least one of the pigment types may be both electrically and magnetically controllable. One example of a multi-pigment display is a display including white pigment particles and black pigment particles. The black pigment particles may be both electrically and magnetically controllable, as an example. In a multi-pigment display, pigment colors may be colors other than black and white. In multi-pigment displays, a color overlay may be used to change the perceived color of the pigment particles, especially when white pigment particles are included.

According to some embodiments, a particle-based display layer may be in a white optical state prior to a change in optical state produced by a recording layer comprising a magnetizable material that stores an image represented by magnetized regions of the magnetizable material. In a multi-pigment display that includes white and black pigment particles, black pigment particles may, in some states, be located toward the front of the display such that incident light is largely absorbed by the black particles. A magnetic field produced by a recording layer as described herein may change an optical state of the display such that incident light becomes largely reflected by the white particles, and is substantially no longer absorbed by the black particles. The change in optical state may include movement of the white and/or black particles within the display. Alternatively, a multi-pigment display may be configured to instead locate white pigment particles toward the front of the display such that incident light is largely absorbed by the white particles. A magnetic field produced by a recording layer may then change an optical state of the display such that incident light becomes largely reflected by the black particles, and is substantially no longer absorbed by the white particles. In such an embodiment, when black particles are moved toward the front of the display using a magnetic field, a dark gray state rather than an extreme black state occurs. Likewise, when white particles are moved towards the front of the display using a magnetic field, a light gray or white gray state occurs. Electrical addressing is usually required to achieve extreme black and white states.

A particle-based display layer may, according to some embodiments, include black pigment particles that are magnetically responsive and white pigment particles that are substantially non-magnetically responsive (though either or both may be electrically responsive). A magnetic field produced by a recording layer as described herein may cause black pigment particles to alter their positions such that, in a region of the display local to the magnetic field, the reflective properties of the display are altered. According to some embodiments, a display may include a single type of magnetically responsive black pigment particles that may be configured to form chains or pillars when exposed to a magnetic field produced by a recording layer as described herein such that they substantially no longer absorbed light incident to the display. In such a case, the response of the black pigment particles to the magnetic field act like a "shutter," effectively altering their state from a "shutter closed" state in which incident light is largely absorbed by the black particles, to a "shutter open" state in which the black pigment particles substantially no longer absorb light incident to the display.

As used herein, an "image" refers to a spatial representation, and is to be distinguished in at least some embodiments from data (e.g., digital 1's and 0's) from which an image may be derived. As will be described further below, images according to embodiments of the present application may include a picture, text, shapes, or any other pattern, and in some embodiments may be embodied as any arrangement or pattern of magnetized regions of a magnetic recording layer that may be transferred or reproduced on a magnetically responsive display. An image may be visible, for example when produced on a display as just described. However, an "image" as used herein may be invisible, at least to the naked eye, in some embodiments. For example, as described herein, an image may be embodied as magnetized regions of a magnetic recording layer. The spatial representation of the magnetized regions may be invisible to the naked eye, but nonetheless represent an image, for example a picture, text and/or shapes.

The aspects and embodiments described above, as well as additional aspects and embodiments, are described further below. These aspects and/or embodiments may be used individually, all together, or in any combination of two or more, as the application is not limited in this respect.

FIG. 1A depicts a display and a magnetizable recording layer, according to some embodiments. Display 100 includes front and back electrodes 101 and 102, respectively, and a plurality of capsules within a display layer 105, the capsules comprising one or more types of electrophoretic pigment particles having different colors. The front electrode 101 may represent the viewing side of the display 100, in which case electrode 101 may be a transparent conductor, such as Indium Tin Oxide (ITO) (which in some cases may be deposited onto a transparent substrate, such as polyethylene terephthalate (PET)).

Display 100 includes recording layer 130 which, as discussed above, may include a magnetizable material that may store an image represented by magnetized regions of the magnetizable material. An illustrative case in which a recording layer has magnetized regions is discussed below in relation to FIG. 2. In the example of FIG. 1A, the recording layer is simply shown as a component of a display.

As shown in FIG. 1B, recording layer 130 may be configured to be removable from display 100, such as by sliding the recording layer out of a slot 140 in the body of display 100. The slot may be separated from the display to prevent the display from being addressed before a recording layer with a recorded image is in place or to prevent the display from being addressed after recording an image on the recording layer when removing. As shown in FIG. 1B, the recording layer 130 is inserted into the slot 130, moved across the back of the display in direction 150, then moved towards the front of the display in direction 160. The display may include a mechanism for holding the recording layer in place and for releasing the recording layer for removal. Additionally, or alternatively, recording layer 130 may be moved towards or away from display layer 105 via any suitable actuator.

In the example of FIG. 1A, display layer 105 is a particle-based display medium between electrodes 101 and 102 that includes a plurality of capsules. Within capsule 110 is a liquid medium and one or more types of colored pigment particles that include white pigment particles 111 and black pigment particles 112. The pigment particles 111 and/or 112 may be controlled (displaced) with an electric field (e.g., produced by electrodes 101-102), thus making the display 100 operate as an electrophoretic display when addressed.

In some use cases, both pigments 111 and 112 may be configured to be displaced within an electric field. For example, one of pigments 111 and 112 may be positively charged and the other pigment may be negatively charged, such that an electric field applied across capsule 110 causes the pigment particles to separate to opposing sides of the capsule. By adjusting the direction of the electric field, the pigment that is located on the viewing side of the display 100 may be selected, thereby producing either a white or a black state as viewed by a user of the display.

In some use cases, one or both of pigments 111 and 112 may move within, or otherwise respond to, a magnetic field. For example, one or both types of pigment particles may align along magnetic field lines, and/or may form chains of particles. In such cases, neither, one or both of pigments 111 and 112 may be electrically charged. In some embodiments, the display 100 may include additional components omitted from FIGS. 1A and 1B for ease of illustration. For example, the display 100 may include a protective layer over the front electrode 101.

Recording layer 130 may comprise any magnetizable material, which includes any material that may hold a spontaneous magnetic field (e.g., as a result of exposure to an external magnetic field). Such materials may include any forms of ferromagnetic and/or ferrimagnetic materials. According to some embodiments, recording layer 130 comprises stainless steel. According to some embodiments, recording layer 130 comprises a metallic layer deposited onto a non-metallic substrate.

Figure 2:
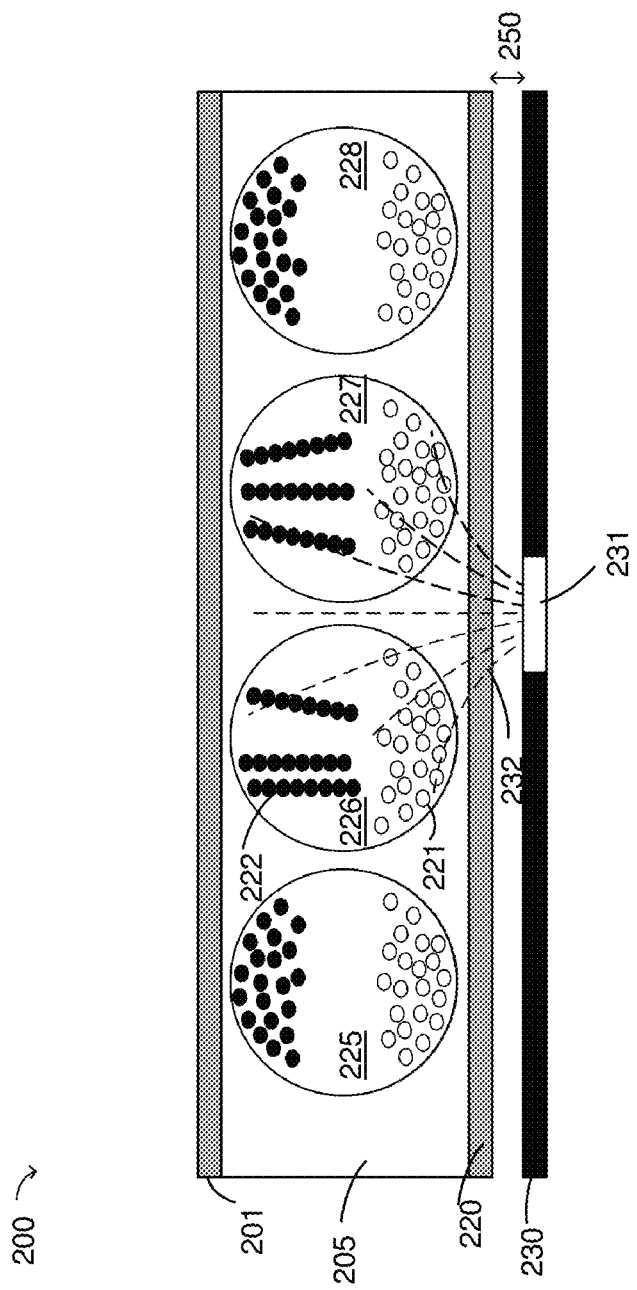
FIG. 2 is a schematic drawing depicting a display and magnetizable recording layer having a magnetized region causing a change in an optical state within a display, according to some embodiments.

FIG. 2 depicts a magnetizable recording layer having a magnetized region causing a change in an optical state within a display, according to some embodiments. Display 200 is an example of the type of display 100 shown in FIG. 1A that includes white reflective pigment particles 221 that do not respond to a magnetic field, and black pigment particles 222 that form chains in the presence of a magnetic field. In the example of FIG. 2, recording layer 230 includes a magnetized region 231 that produced a magnetic field depicted in part by field lines 232, which causes black pigment particles within capsules 226 and 227 to form chains. The magnetized region 231 may represent part of a larger image magnetically stored in the recording layer.

It will be appreciated that neither the thickness of recording layer 230 relative to that of display layer 205, nor the distance of the recording layer 230 from the display layer 205 (labeled 250 in FIG. 2) are necessarily shown to scale, and that in practice the recording layer will generally be of roughly comparable thickness to the display layer yet may be a distance from the recording layer equal to several times the thickness of the display layer. For example, the recording layer 230 may have a thickness of 0.25 mm, the display layer 205 and electrodes 201-202 may have a combined thickness of 0.3 mm, and the distance 250 between electrode 202 and recording layer 230 may be around 1 mm. It will further be appreciated that recording layer 230 may cause a change in optical state in a large number of capsules of the display 200, and not merely the two illustrative capsules 226 and 227 shown in FIG. 2.

In the example of FIG. 2, recording layer 230 may have been brought into proximity to display layer 205, thereby causing the magnetic field 232 produced by region 231 to cause the change in the black pigment particles within capsules 226 and 227. That is, prior to application of the recording layer 230, pigment particles within capsules 226 and 227 may have been situated as in capsules 225 and 228, with white particles on the non-viewing side and with black particles on the viewing side, of the display 200. This represents a black (or opaque) display state. When the magnetic field 232 produced by recording layer 230 reached a sufficient intensity within capsules 226 and 227, the black pigment particles in those capsules formed chains. These black pigment particles are configured to form chains that require the pigment particles to move distances that are comparable to the inter-particle separation prior to application of the magnetic field. Accordingly, the chains may be formed quickly upon application of the magnetic field.

The proximity of the recording layer 230 to the display layer 205 necessary to produce a sufficient magnetic field within a capsule of the display layer to result in a change in an optical state of the display (e.g., the chaining process described above) may depend on the magnitude of the magnetic field produced by the recording layer. In general, however, the distance 250 that may be sufficient to cause the change in optical state may be between 0.1 mm and 5 mm, such as between 0.5 mm and 3 mm, such as 1-2 mm.

Due to the shape and structure of the chains of black pigment particles, light entering display 200 from the viewing side may largely pass by black pigment chains 222 and be reflected from the white pigment particles 221. Accordingly, in the configuration shown in FIG. 2, capsules 226 and 227 will appear white (i.e., light gray), whereas capsules 225 and 228 will appear black (i.e., dark gray), on the viewing side of the display 200. The application of the magnetic field produced from magnetized region 231 of the recording layer has thereby altered a region of the display, namely that region comprising capsules 226 and 227, from a black state to a white state.

Accordingly, where a recording layer includes one or more magnetized regions, such as region 231, a facsimile of an image represented by these magnetized regions may be produced on display 200.

It will be appreciated that, although FIG. 2 illustrates an example of a display that is altered from a black state to a white state by a magnetic writing implement, a display may similarly be produced that is altered from a white state to a black state by a magnetic writing implement, and that FIG. 2 is merely one illustrative example of a display with which a recording layer as described herein may be used.

Black pigment particles 222 may be restored to an unchained state (as shown in capsules 225 and 228) via any suitable manner, including by application of an electric field, by application of a magnetic field different to that provided by recording layer 230, or otherwise.

Figure 3:
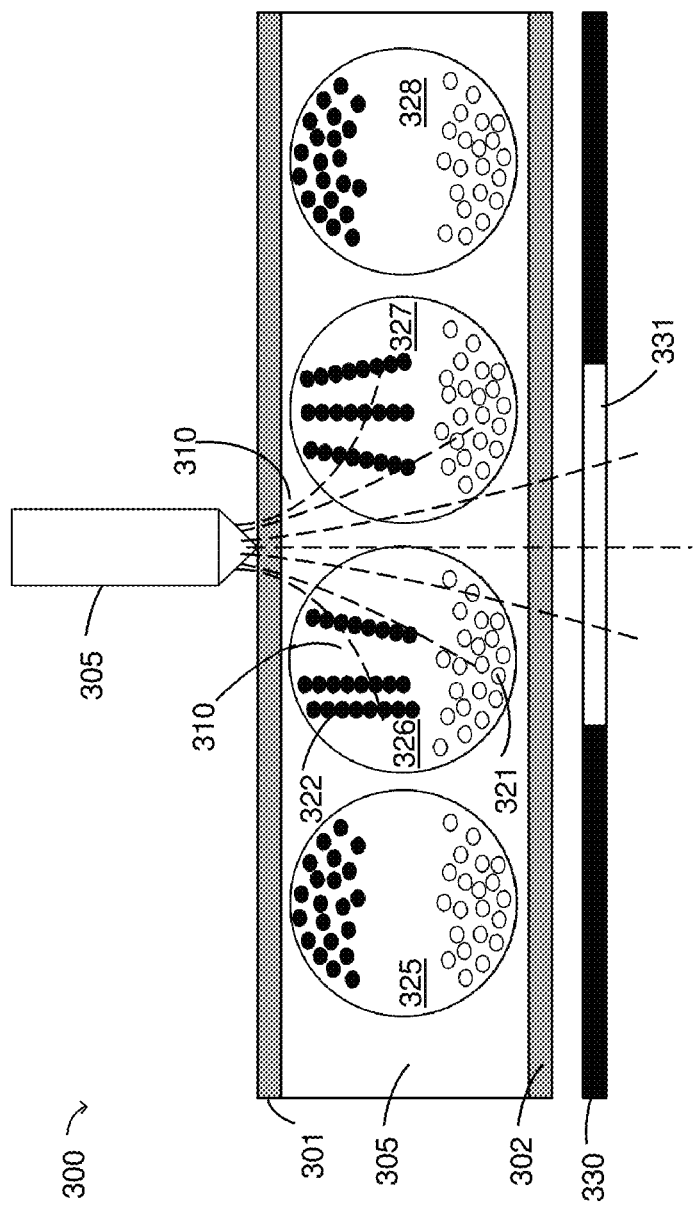
FIG. 3 is a schematic drawing depicting a writing implement causing a change in an optical state of a display, according to some embodiments.

FIG. 3 depicts a writing implement causing a change in an optical state of a display, according to some embodiments. Display 300 is an example of the type of display 100 shown in FIG. 1A that includes white reflective pigment particles 321 that do not respond to a magnetic field, and black pigment particles 322 that form chains in the presence of a magnetic field. In the example of FIG. 3, a writing implement 305 produces a magnetic field depicted in part by field lines 310 that causes black pigment particles 322 to form chains. In the example of FIG. 3, a recording layer 330 is provided but does not produce a magnetic field proximate to the portion of display 300 shown in FIG. 3. Recording layer 330 may, in general, include magnetized regions 331 that may be addressed simultaneously with the writing implement 305. Of course, magnetizable region 331 may also be addressed away from the display 100, as described below.

It will be appreciated that writing implement 305 is not shown to scale relative to display 300, and that in practice the writing implement will generally be much larger than capsules 325-328. For example, the writing implement 305 may cause a change of state of black pigment particles in a large number of capsules of display 300, and not merely the two illustrative capsules 326 and 327 shown in FIG. 3.

In the example of FIG. 3, prior to application of the writing implement 305, pigment particles within capsules 326 and 327 were situated as in capsules 325 and 328, with white particles on the non-viewing side and with black particles on the viewing side, of the display 300. This represents a black (or opaque) display state. When the magnetic field produced by writing implement 301 reached a sufficient intensity within capsules 326 and 327, the black pigment particles in those capsules formed chains.

The embodiments depicted in FIGS. 2 and 3 illustrating the effect of a magnetized region of a recording layer and the effect of a magnetized writing implement, respectively, may be combined such that a display may be addressed by a recording layer and/or by a writing implement. Where the display is addressed both by a recording layer and a writing implement, the addressing may be performed in any order, or both may be addressed simultaneously with the same device. For example, a recording layer may produce an image on a display by causing a change in optical state of regions of the display layer, and subsequently additional regions of the display layer may exhibit a change in optical state produced by a magnetic writing implement. The mechanisms through which each change in optical state occurs may or may not be the same.

Figure 4:
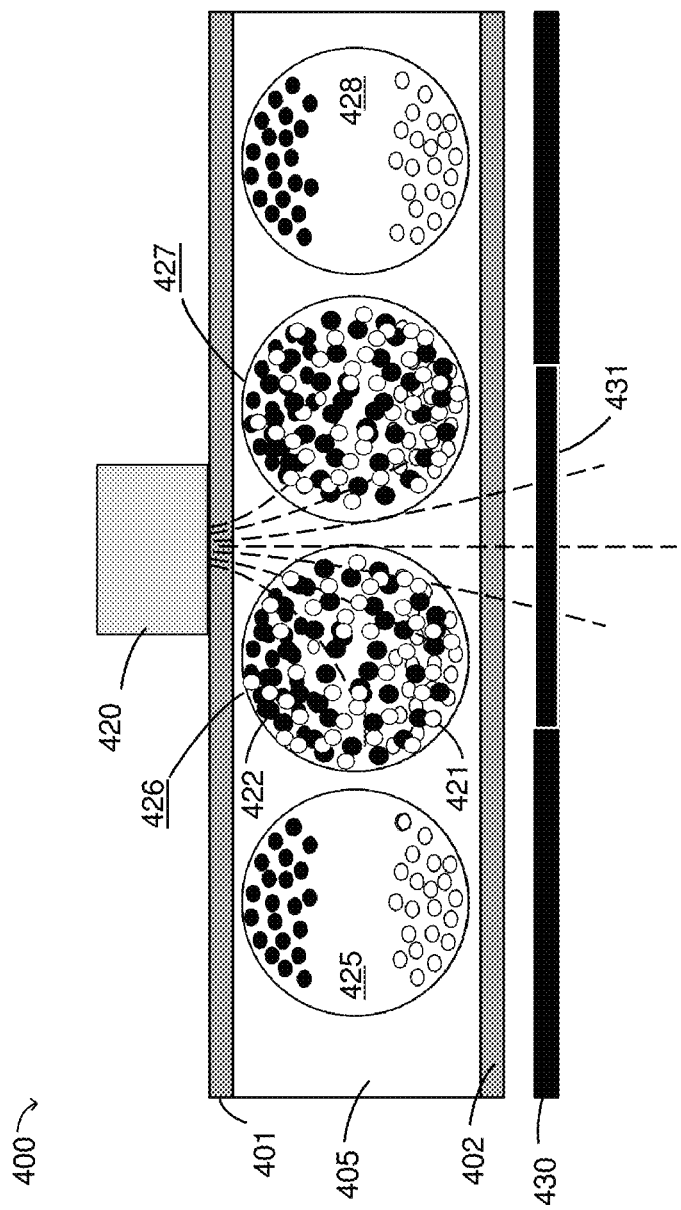
FIG. 4 depicts an erasing implement reversing a change in an optical state of a display, according to some embodiments.

FIG. 4 depicts an erasing implement (also referred to herein in some embodiments simply as an "eraser") reversing a change in an optical state of a display, according to some embodiments. Display 400 is an example of the type of display 100 shown in FIG. 1 that includes white reflective pigment particles 421 that do not respond to a magnetic field, and black pigment particles 422 that form chains in the presence of a magnetic field. In the example of FIG. 4, an erasing implement 420 produces a magnetic field depicted in part by field lines 410 that causes black pigment particles 422 to cease forming chains. In the example of FIG. 4, the recording layer 430 is also "erased" by the erasing implement 420, thereby causing magnetizable region 431 to change state. Recording layer 430 may, in general, include magnetized regions as described herein, but for the sake of clarity is not shown as having such regions in FIG. 3. While it is not shown here, the erasing implement 420 may be designed so that its local magnetic field is not sufficient to change the state of magnetizable region 431. Erasing implements 420, so designed, will be useful for allowing a display system to be used repeatedly for, e.g., practicing penmanship on "lined paper", whereupon the penmanship can erased and the lines left behind.

In the example of FIG. 4, prior to application of the erasing implement 420, pigment particles within capsules 426 and 427 were situated as in capsules 326 and 327 shown in FIG. 3, with white particles on the non-viewing side and with black particles on the viewing side forming chains, thus representing a white (or transparent) display state. When the magnetic field produced by erasing implement 420 reached a sufficient intensity within capsules 426 and 427, the chains of black pigment particles in those capsules separated.

Erasing implement 420 may produce a magnetic field suitable for altering the display layer 405 and/or recording layer 430 to a uniform state. For a display layer comprising electrophoretic particles, as shown in FIG. 4, the uniform state may be a transparent or opaque state of the layer, or may be a semi-transparent or semi-opaque state. For example, display layer 405 may be configured in a white or a black state in which the respective particles reflect incoming light (by moving the particles under an electric field and/or may applying a magnetic field, thereby causing a change in state of the particles). The erasing implement 420 may be configured to cause display layer 405 to produce gray states in varying degrees of lightness/darkness to make the optical state of the display light or dark. In the example of FIG. 4, the erasing implement 420 may causes the electrophoretic particles in the display layer to return to the shutter closed state and the white particles move in response to the black particles moving to create a gray state. An electric field may thereafter be applied to the electrophoretic particles to move the two types of particles apart, thereby producing an extreme white or black state.

Erasing implement 420 may be of any size or shape including rectangular, triangular, circular or a long narrow strip equal to the width of the display. The size and shape of the erasing implement may differ based on the area to be erased.

Figure 5A:
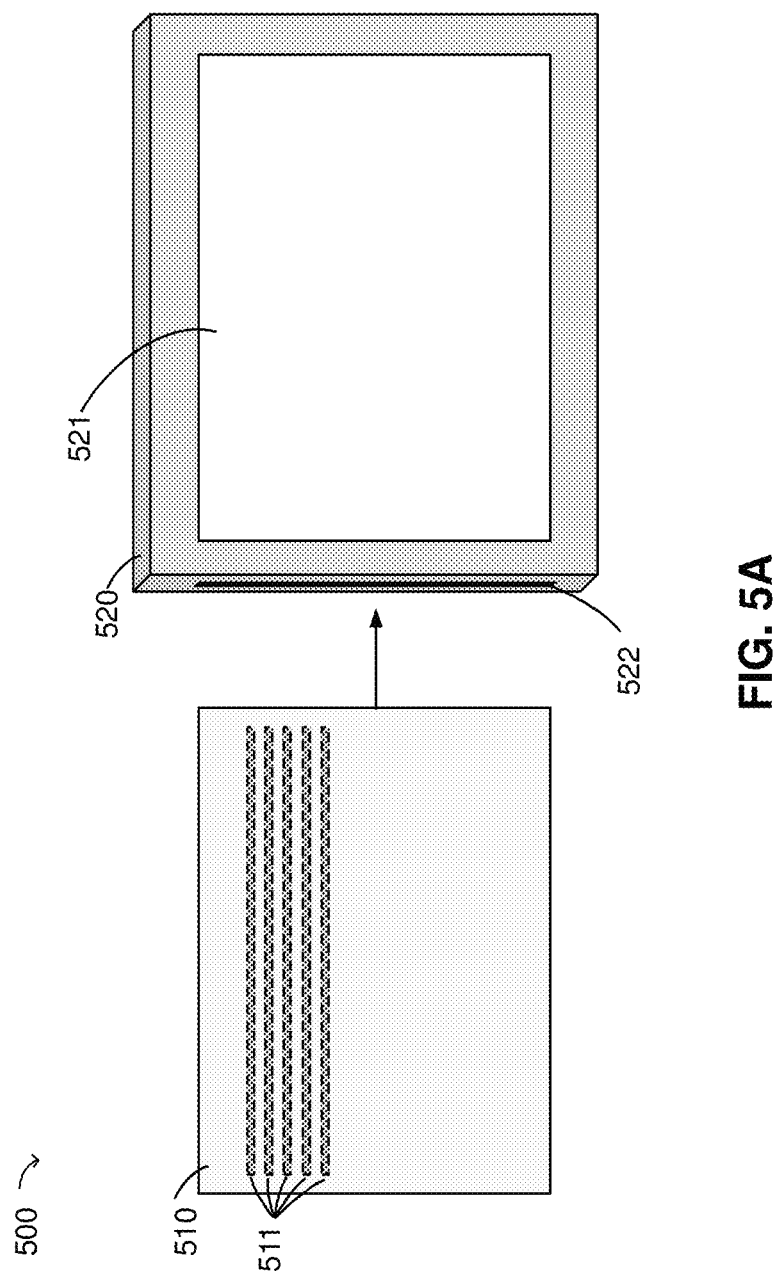
FIG. 5A is a schematic drawing illustrating insertion of a magnetizable recording layer having an image stored thereon into a display, according to some embodiments.

FIGS. 5A-5C illustrate addressing of a display by a magnetizable recording layer having an image stored thereon, according to some embodiments. As discussed above, a recording layer may include a magnetizable material having magnetized regions thereon representing an image, even though the image may be invisible to the naked eye. In the example of FIG. 5A, a recording layer 510 includes magnetized regions 511 and is to be inserted into a display 520 having a display screen 521 and a slot (or opening) 522 for reception of the recording layer. Magnetized regions 511 are in the shape of five parallel lines intended, in the illustrative example of FIGS. 5A-5C, to be used as a template for writing of a musical score.

The recording layer 510 may have a width (a direction across the page in FIG. 5A) and/or a length (a direction up the page in FIG. 5A) that is at least 12 inches. In some cases, the recording layer may have a width and/or length that is greater than two feet, or greater than four feet. The recording layer 510 may have a depth (a direction into the page in FIG. 5A) that is less than 0.5 inches, or less than 0.1 inches, or less than 0.05 inches.

In FIG. 5B, recording layer 510 has been inserted into display 520 and brought into proximity of a magnetically responsive display layer within display 520. This may be achieved simply by inserting the recording layer into slot 522, or may be achieved by inserting the recording layer and then activating a function of the display to move the inserted recording layer towards the magnetically responsive recording layer (e.g., by activating an electrical mechanism or by manually engaging a mechanism to move the recording layer towards the viewing side of the display).

As a result of the recording layer having been brought into proximity of a magnetically responsive display layer within display 520, the image represented by magnetized regions 511 is reproduced on display 520 as image 525. For example, the pattern of magnetized regions of recording layer 510 caused proximate regions of the magnetically responsive display layer to change optically from a white state to a black state. Image 525 is thereby of the same (or substantially the same) physical size as the magnetized regions 511. In some cases, since the magnetic field of magnetized regions may propagate outwards from the recording layer, small regions of the magnetically responsive display layer not directly opposite to magnetized regions of the recording layer may undergo a change in optical state. Accordingly, it will be appreciated that while image 525 would be expected to be almost precisely the same size as magnetized regions 511, there may be a small "blooming" effect caused by a spreading out of the magnetic field between the recording layer and the magnetically responsive display layer.

In FIG. 5C, additional regions of display 520 have undergone a state change from a white state to a black state (i.e., as described above, a dark state) due to use of a magnetic writing implement on the surface of display 520. In the example of FIG. 5C, a user has drawn a treble clef and three musical notes on the staves produced from the use of the recording layer shown in FIGS. 5A-5B. The magnetic writing implement may cause additional regions of the recording layer within display 520 to become magnetized. Alternatively, the recording layer may have been removed from display 520 or otherwise moved sufficiently far from the viewing surface of display 520 such that the magnetic field of the magnetic writing implement does not cause additional magnetization of the recording layer.

FIGS. 6A-6C illustrate local erasing of a magnetizable recording layer having an image stored thereon, according to some embodiments. As discussed above, a recording layer may include a magnetizable material having magnetized regions thereon representing an image, even though the image may be invisible to the naked eye. In the example of FIG. 6A, a recording layer 610 includes magnetized regions 611 in the shape of five parallel lines and non-magnetized regions 614 such as depicted in FIG. 5A. FIG. 6B depicts using an erasing implement 612 to produce a magnetic field 613 suitable for altering the magnetized regions 611 on a recording layer 610. FIG. 6C depicts the non-magnetized region 614 of the recording layer 610 erased in FIG. 69.

Figure 7:
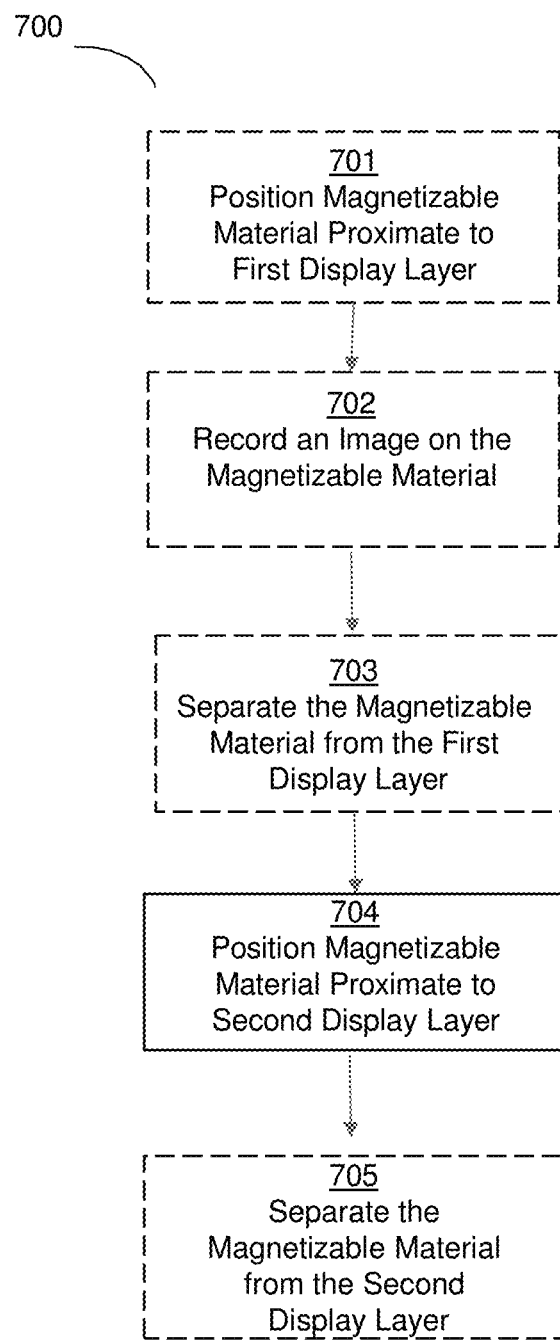
FIG. 7 is a schematic drawing depicting a method of storing an image on a magnetizable material and subsequently recalling the image on a display, according to some embodiments.

FIG. 7 depicts a method of storing an image on a magnetizable material and subsequently recalling the image on a display, according to some embodiments. Method 700 includes acts 701-705, of which acts 701, 702, 703 and 705 are optional (indicated via dashed lines in FIG. 7). The method 700 includes acts of recording an image on a recording layer, though it will be appreciated that such a recording layer may be used to produce a facsimile of the image within a magnetically responsive display layer with the image having been previously recorded on the recording layer. Accordingly, a user may only perform act 704, described in further detail below, and may optionally perform one or more of acts 701, 702, 703 and 705.

In act 701, a magnetizable material is positioned proximate to a first display layer. The magnetizable material may be part of a recording layer, as described and discussed above. The display layer may be a magnetically responsive display layer.

In act 702, an image is recorded on the magnetizable material by magnetizing regions of the medium representative of the image. This may be performed using a magnetic writing implement, examples of which have been described herein. It will be appreciated that act 702 may be performed with, or without, act 701 having previously been performed. That is, in act 702 regions of a magnetizable material may be magnetized, thereby representing an image, while the medium is positioned proximate to a display layer (as implied by the performance of act 701). For example, a user may write onto a display using a magnetic writing implement, thereby producing a magnetic effect in the display as well as in the magnetizable material. Alternatively, in act 702 regions of a magnetizable material may be magnetized without a display layer being present. For example, a magnetic writing implement or other device may be used directly onto the magnetizable material.

In act 703, the magnetizable material is separated from a first display layer. Optional act 703 will therefore be performed only when optional act 701 was also previously performed.

In act 704, the magnetizable material is positioned proximate to a second display layer. Irrespective of which of optional acts 701, 702 and 703 were previously performed, it is assumed that, in act 704, the magnetizable material includes magnetized regions representative of an image. Accordingly, the second display layer may experience a change in optical state such that a facsimile of the image is produced on the display. For example, the second display layer may be a magnetically responsive display layer, examples of which are discussed herein. It will be appreciated that the meaning of the word "proximate" with regards to acts 701 and 704 may, or may not, have the same meaning. That is, the position of the magnetizable material necessary for the image to be recorded upon relative to the means by which the regions of the medium become magnetized may not necessarily be the same as the position of the medium in act 704 that causes a change in optical state of the second display layer.

In optional act 705, the image represented by the magnetized regions of the magnetizable material may be removed. Alternatively, the magnetizable material may be erased, such as by a magnetic erasing implement, examples of which are discussed herein. The erasing may be performed while the magnetizable material remains proximate to the second display layer, or otherwise.

As one non-limiting example of performing method 700, a user may insert a recording layer into a first display system (act 701) and write text or some other type of image onto a surface of the display system with a magnetizable writing implement (act 702). Having magnetized regions of the recording layer, the user may remove the recording layer from the first display system (act 703). Subsequently, the same or a different user may insert the recording layer having the magnetized regions into a second display system (act 704). As discussed above, this may cause the text (or other image) previously written onto the surface of the first display system to be duplicated on the second display system. The user may write onto the second display system, thereby potentially magnetizing additional regions of the recording layer, and/or may utilize a magnetic eraser to demagnetize or otherwise alter the magnetization of regions of the recording layer before separating the magnetizable material from the second display (act 705).

FIG. 8 depicts a display system with which aspects of the invention may be implemented. System 800 includes a display 810 comprising an electrophoretic layer 820 and a recording layer 830, a magnetic stylus 840 and a magnetic eraser 850.

Display 810 may include any number of components, and is not limited to the electrophoretic layer 820 and recording layer 830 shown in FIG. 8. For example, display 810 may comprise any number of: substrates, conductors, adhesives, or combinations thereof. Substrates may be transparent and/or opaque and may include a polymer resin, such as Polyethylene terephthalate (PET). Conductors may be transparent and/or opaque and may include, though are not limited to, conductors such as ITO, poly(3,4-ethylenedioxythiophene) (PEDOT), carbon nanotubes (CNTs), graphene, carbon nanowires, or combinations thereof. Layers of the display such as a backplane may include a substrate onto which a conductor is coated. Display 810 may include one or more power supplies that may, for example, be used to drive a voltage across two electrodes of the display.

Electrophoretic layer 820 may be any layer within display 810 that includes electrophoretic particles, which may be pigmented particles, such as polymeric particles stained with a heavy metal oxide or other such pigmented electrophoretic particles. According to some embodiments, the articles may be provided within capsules that are held together by a binder material such as polyurethane. Any number of types of electrophoretic particles may be provided, and each may independently be responsive to a magnetic field and/or responsive to an electric field.

As a non-limiting illustrative embodiment, the electrophoretic layer 720 may include a first type of particle comprising a Bayferrox® iron oxide black pigment (e.g., CM-318) and having a silane surface treatment (e.g., Z6032 silane made by Dow Corning®); and a second type of particle having a white pigment.

Recording layer 830 may include any magnetizable material, which includes any material that may hold a spontaneous magnetic field (e.g., as a result of exposure to an external magnetic field). Such materials may include any forms of ferromagnetic and/or ferrimagnetic materials. According to some embodiments, recording layer 830 includes a stainless steel alloy and may have a thickness between 0.001 inches and 0.050 inches, such as 0.01 inches.

A typical magnetic field strength exhibited by the recording layer 830 in magnetized regions may be, for example, between 500 milliGauss and 5 Gauss. The magnetic field strength of magnetized regions of a recording layer may be such that it is at least of a strength sufficient to cause a change in state of a magnetically responsive display layer to which the recording layer is proximate (e.g., proximate within 1 mm). The magnetic field strength of magnetized regions of a recording layer may also be such that it is not so large as to inhibit operation of a display (e.g., an electrophoretic display) with which the recording layer is to be used (e.g., inhibiting the motion of charged particles in an electrophoretic display).

Recording layer 830 may include a contiguous solid piece of magnetizable material having magnetized regions and non-magnetized regions where the image is represented by the magnetized regions or the non-magnetized regions. Recording layer 830 may include a noncontiguous piece of magnetizable material having magnetized regions and non-magnetized regions formed by cutting out regions the magnetizable material. These regions may be different shapes and patterns.

Display 810 may include one or more mechanisms for providing and/or removing recording layer 830 from the device. This may include electrical and/or manual mechanical actuators that move the recording layer within the display 810, and/or electrical and/or manual actuators that eject and/or receive the recording layer into the display. It will be appreciated that, as discussed above, display 810 may be configured to contain multiple recording layers.

Magnetic stylus 840 may include any handheld writing implement that produces a magnetic field. For example, the stylus may be a plastic container containing a magnet, for example, a permanent magnets rare earth variety. According to some embodiments, one or more magnets may be added to a non-magnetic writing implement such as a pen, marker or pencil to produce a suitable magnetic stylus.

Magnetic eraser 850 may include any handheld implement that produces a magnetic field suitable for altering the electrophoretic layer 820 and/or recording layer 830 to a uniform state. As discussed above, for an electrophoretic layer the uniform state may be a transparent or opaque state of the layer, or may be a semi-transparent or semi-opaque state. For example, in an electrophoretic layer comprising white and black pigment particles, the display may typically display information using the white or black states in which the respective particles reflect incoming light. The magnetic eraser 850 may be configured to produce the white state, the black state, or a uniform mid-gray state that is neither black nor white.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A display system, comprising:
   a front electrode;
   a rear electrode;
   a display layer sandwiched between the front and rear electrodes comprising an encapsulated fluid including a first set of particles, which are magneto-electrophoretic particles, the magneto-electrophoretic particles configured to move through the fluid in response to an applied magnetic field and to move through the fluid in response to an applied electric field;
   a power supply and a controller configured to provide an electric potential to the front and rear electrodes;
   a removable recording layer comprising a magnetizable material;
   a retainer to hold the removable recording layer in proximity to the display layer, and
   a handheld writing implement producing a magnetic field that, when applied to a surface of the display system, causes motion of the magneto-electrophoretic particles and causes magnetization of at least part of the recording layer.

2. The display system of claim 1, further comprising a second set of particles, which are electrophoretic particles configured to move in response to application of an electric field, wherein the first and second sets of particles have opposite electric charges and contrasting colors.

3. The display system of claim 1, wherein the fluid is a color that contrasts with the color of the first set of particles, which are magneto-electrophoretic particles.

4. The display system of claim 1, wherein the retainer is configured to move the recording layer relative to the display layer.

5. The display system of claim 1, wherein the recording layer comprises a sheet of magnetizable material comprising both magnetized regions and non-magnetized regions within the sheet of magnetizable material.

6. The display system of claim 5, wherein the non-magnetized regions are formed by erasing regions of the magnetizable material.

7. The display system of claim 1, further comprising a body surrounding the front electrode, the rear electrode, the display layer, the recording layer, and the retainer, the body including at least one slot through which the recording layer may be inserted into the retainer so that the recording layer is held in proximity to the display layer.

8. A method comprising:
   providing a display system comprising a front electrode, a rear electrode, a display layer sandwiched between the front and rear electrodes comprising an encapsulated fluid including magneto-electrophoretic particles, the magneto-electrophoretic particles configured to move through the fluid in response to an applied magnetic field and to move through the fluid in response to an applied electric field, a power supply and a controller configured to provide an electric potential to the front and rear electrodes, a recording layer comprising a magnetizable material in proximity to the display layer, and a handheld writing implement producing a magnetic field; and
   addressing both the display layer and the magnetizable material simultaneously with the handheld writing implement to create an image.

9. The method of claim 8, further comprising:
   removing the magnetizable material from proximity to the display layer; and
   providing an electric potential to the front or rear electrode to cause the magneto-electrophoretic particles to move toward the front electrode, thereby removing the image from the display.

10. The method of claim 9, further comprising:
    returning the magnetizable material to proximity of the display layer; and
    allowing the image to reform in the display layer.

11. The method of claim 8, wherein the magnetizable material is ferromagnetic.

* * * * *